United States Patent
Kinzie et al.

(10) Patent No.: US 8,287,228 B2
(45) Date of Patent: Oct. 16, 2012

(54) SYSTEM AND METHODS FOR CONTROLLING THE AMPLITUDE MODULATION OF NOISE GENERATED BY WIND TURBINES

(75) Inventors: Kevin Wayne Kinzie, Spartanburg, SC (US); Thomas Joseph Fischetti, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/173,771

(22) Filed: Jun. 30, 2011

(65) Prior Publication Data

US 2012/0027591 A1 Feb. 2, 2012

(51) Int. Cl.
*F03B 11/04* (2006.01)
(52) U.S. Cl. ............................. 415/1; 415/119
(58) Field of Classification Search .................. 415/119, 415/118, 35, 1; 181/206
See application file for complete search history.

(56) References Cited

U.S. PATENT DOCUMENTS

| 5,448,645 | A | 9/1995 | Guerci et al. |
| 5,636,287 | A | 6/1997 | Kubli et al. |
| 6,688,841 | B1 | 2/2004 | Wobben |
| 2004/0057827 | A1 | 3/2004 | Pal et al. |

FOREIGN PATENT DOCUMENTS

| EP | 1 748 184 A2 | 1/2007 |
| EP | 2 000 665 A2 | 12/2008 |
| FR | 2707415 | 1/1995 |
| WO | WO 2008043874 A1 * | 4/2008 |

OTHER PUBLICATIONS

Machine Translation of family document for WO2008/043874A1.*

* cited by examiner

*Primary Examiner* — Dwayne J White
(74) *Attorney, Agent, or Firm* — Dority & Manning, P.A.

(57) ABSTRACT

In one aspect, a method for controlling the amplitude modulation of the noise generated by wind turbines is generally disclosed. The method may include determining a sound characteristic of a turbine sound wave generated by a wind turbine and generating an additive sound wave based on the sound characteristic such that a resultant sound wave is produced having a peak-to-peak amplitude that is smaller than a peak-to-peak amplitude of the turbine sound wave.

20 Claims, 9 Drawing Sheets

SYSTEM AND METHODS FOR CONTROLLING THE AMPLITUDE MODULATION OF NOISE GENERATED BY WIND TURBINES

FIELD OF THE INVENTION

The present subject matter relates generally to wind turbines and, more particularly, to a system methods for controlling the amplitude modulation of noise generated by wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation of a wind turbine, the rotation of the rotor blades through air generates aerodynamic noise. Due to the amplitude modulation (i.e., the peak-to-peak variation) of the aerodynamic noise, a "swooshing" or periodic pulsing sound is typically heard in the near field of the wind turbine (i.e., the area directly around the wind turbine). Such sounds are typically seen as a nuisance and, thus, regulations are typically put in place establishing maximum decibel (dB) levels for wind turbines operating around residential communities and other populated areas. As a result, wind turbines are typically designed to operate below these maximum dB levels. However, current research now suggests that the peak-to-peak amplitude of the modulated noise generated by wind turbines may be higher at locations in the far field ((i.e., locations a certain distance (e.g., 1-4 kilometers) away from the wind turbines) than in the near field due to propagation effects and/or constructive interference. As such, there is a risk that wind turbines operating below the maximum dB levels in the near field may actually be exceeding these levels in the far field.

Various methods have been proposed for reducing the noise emissions of wind turbines. For example, it has been proposed to reduce aerodynamic noise by de-rating all of the wind turbines within a wind turbine farm in order to keep turbine speeds low during time intervals (e.g., during nighttime or other times at which reduced noise is desired). However, such de-rating of the wind turbines significantly reduces the power production of the farm. Another proposed method is to actively pitch the blades of a wind turbine as the blades pass through a particular range of azimuth positions (e.g., pitching the blades as they pass from the one o'clock to the four o'clock position). However, similar to de-rating the wind turbines, such continuous feathering of the blades results in a significant reduction in overall power production.

Accordingly, a system and method for controlling the amplitude modulation of noise generated by a wind turbine that does not significantly reduce power production would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for controlling the amplitude modulation of noise generated by wind turbines. The method may generally include determining a sound characteristic of a turbine sound wave generated by a wind turbine and generating an additive sound wave based on the sound characteristic such that a resultant sound wave is produced having a peak-to-peak amplitude that is smaller than a peak-to-peak amplitude of the turbine sound wave.

In another aspect, the present subject matter discloses a method for controlling the amplitude modulation of noise generated by a plurality of wind turbines. The method may generally include determining a sound characteristic of a turbine sound wave generated by each wind turbine of the plurality of wind turbines and generating an additive sound wave based on the sound characteristic of each turbine sound wave such that a resultant sound wave is produced having a peak-to-peak amplitude that is smaller than a peak-to-peak amplitude of each turbine sound wave.

In a further aspect, the present subject matter discloses a system for controlling the amplitude modulation of noise generated by a wind turbine. The system may generally include a sound meter configured to measure a sound characteristic of a turbine sound wave generated by the wind turbine, a sound generating device configured to generate an additive sound wave and a controller communicatively coupled to the sound meter and the sound generating device. The controller may be configured to receive sound characteristic measurements from the sound meter and, based on the sound characteristic measurements, control the additive sound wave that is generated by the sound generating device so that a resultant sound wave is produced that has a peak-to-peak amplitude that is smaller than a peak-to-peak amplitude of the turbine sound wave.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and methods for controlling the amplitude modulation of noise generated by wind turbines. For example, in several embodiments, two or more wind turbines may be controlled so as to prevent such wind turbines from operating in-phase relative to one another. As such, the sound waves generated by the wind turbine may be prevented from constructively interfering and producing a resultant sound wave having a peak-to-peak amplitude greater than the peak-to-peak amplitude of any of the individual sound waves. In other embodiments, additive sound waves may be generated that interfere with and/or augment the sound waves generated by the wind turbines. Thus, the resultant sound waves may have a peak-to-peak amplitude that is significantly less than the peak-to-peak amplitude of the sound waves generated by the wind turbines.

Figure 1:
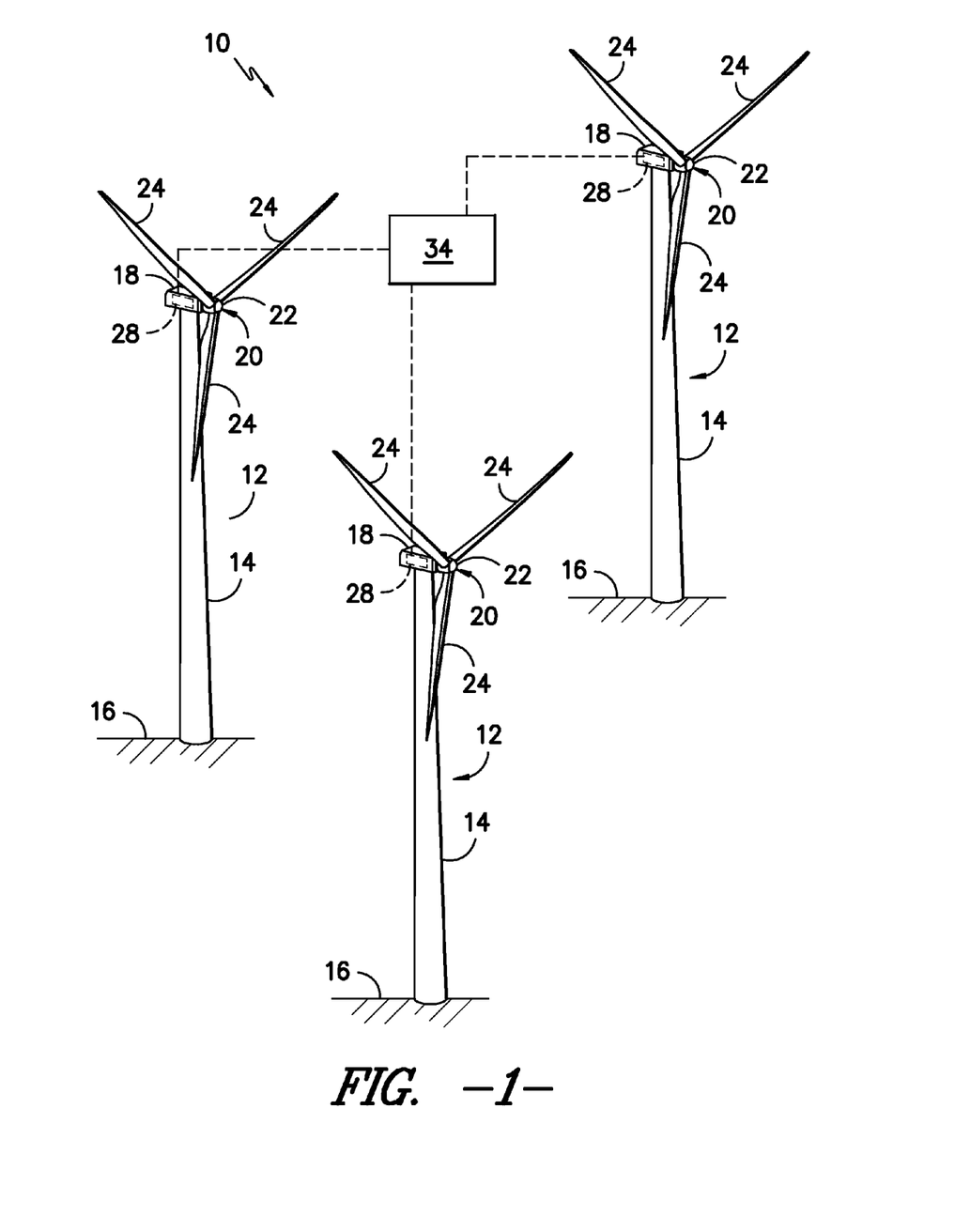
FIG. 1 illustrates a perspective view of one embodiment of several wind turbines within a wind turbine farm.

Referring now to the drawings, FIG. 1 illustrates a perspective view of one embodiment of several wind turbines 12 located within a wind turbine farm 10. As shown, each wind turbine 12 includes a tower 14 extending from a support surface 16, a nacelle 18 mounted on the tower 14, and a rotor 20 coupled to the nacelle 18. The rotor 20 includes a rotatable hub 22 and at least one rotor blade 24 coupled to and extending outwardly from the hub 22. For example, in the illustrated embodiment, the rotor 20 includes three rotor blades 24. However, in an alternative embodiment, the rotor 20 may include more or less than three rotor blades 24. Each rotor blade 24 may be spaced about the hub 22 to facilitate rotating the rotor 20 to enable kinetic energy to be transferred from the wind into usable mechanical energy, and subsequently, electrical energy. For instance, the hub 22 of each wind turbine 10 may be rotatably coupled to an electric generator 26 (FIG. 2) positioned within the nacelle 18 to permit electrical energy to be produced. It should be appreciated that, although only three wind turbines 12 are shown in FIG. 1, the wind turbine farm 10 may generally include any suitable number of wind turbines 12.

Additionally, each wind turbine 12 may include a turbine control system or turbine controller 28 centralized within the nacelle 18. In general, the turbine controller 28 may comprise a computer or other suitable processing unit. Thus, in several embodiments, the turbine controller 28 may include suitable computer-readable instructions that, when implemented, configure the controller 28 to perform various different functions, such as receiving, transmitting and/or executing wind turbine control signals. As such, the turbine controller 28 may generally be configured to control the various operating modes (e.g., start-up or shut-down sequences) and/or components of the wind turbine 12. For example, the controller 28 may be configured to control the blade pitch or pitch angle of each of the rotor blades 24 (i.e., an angle that determines a perspective of the rotor blades 24 with respect to the direction of the wind) to control the power output generated by the wind turbine 12 by adjusting an angular position of at least one rotor blade 24 relative to the wind. For instance, the turbine controller 28 may control the pitch angle of the rotor blades 24, either individually or simultaneously, by transmitting suitable control signals to a pitch drive or pitch adjustment mechanism 30 (FIG. 2) of the wind turbine 12. Further, as the direction of the wind changes, the turbine controller 28 may be configured to control a yaw direction of the nacelle 18 to position the rotor blades 24 with respect to the direction of the wind, thereby controlling the load and power output generated by the wind turbine 12. For example, the turbine controller 28 may be configured to transmit control signals to a yaw drive mechanism 32 (FIG. 2) of the wind turbine 10 such that the nacelle 18 may be rotated on top of the tower 14.

Moreover, as shown in FIG. 1, the turbine controller 28 of each wind turbine 12 may be communicatively coupled to a farm controller 34. For instance, in one embodiment, each turbine controller 28 may be communicatively coupled to the farm controller 34 through a wired connection, such as by connecting the controllers 28, 34 through a suitable communicative link (e.g., a suitable cable). Alternatively, each turbine controller 28 may be communicatively coupled to the farm controller 34 through a wireless connection, such as by using any suitable wireless communications protocol known in the art.

Similar to each turbine controller 28, the farm controller 34 may generally comprise a computer or other suitable processing unit. Thus, in several embodiments, the farm controller 34 may include suitable computer-readable instructions that, when implemented, configure the controller 34 to perform various different functions, such as issuing and/or transmitting wind turbine control signals to each turbine controller 28. As such, the farm controller 34 may generally be configured to control any or all of the turbine controllers 28 in the wind turbine farm 10 in order to change or alter the operating mode of any number of the wind turbines 12. Specifically, the farm controller 34 may be configured to command a single wind turbine 12, particular groups of wind turbines 12 or all of the wind turbines 12 in the wind turbine farm 10 to enter into a particular operating mode and/or to perform a particular action in order to adapt the wind turbine(s) 12 to changing operating conditions and/or, as will be described below, to facilitate a reduction in the amplitude modulation of the noise generated by the wind turbine(s) 12.

Figure 2:
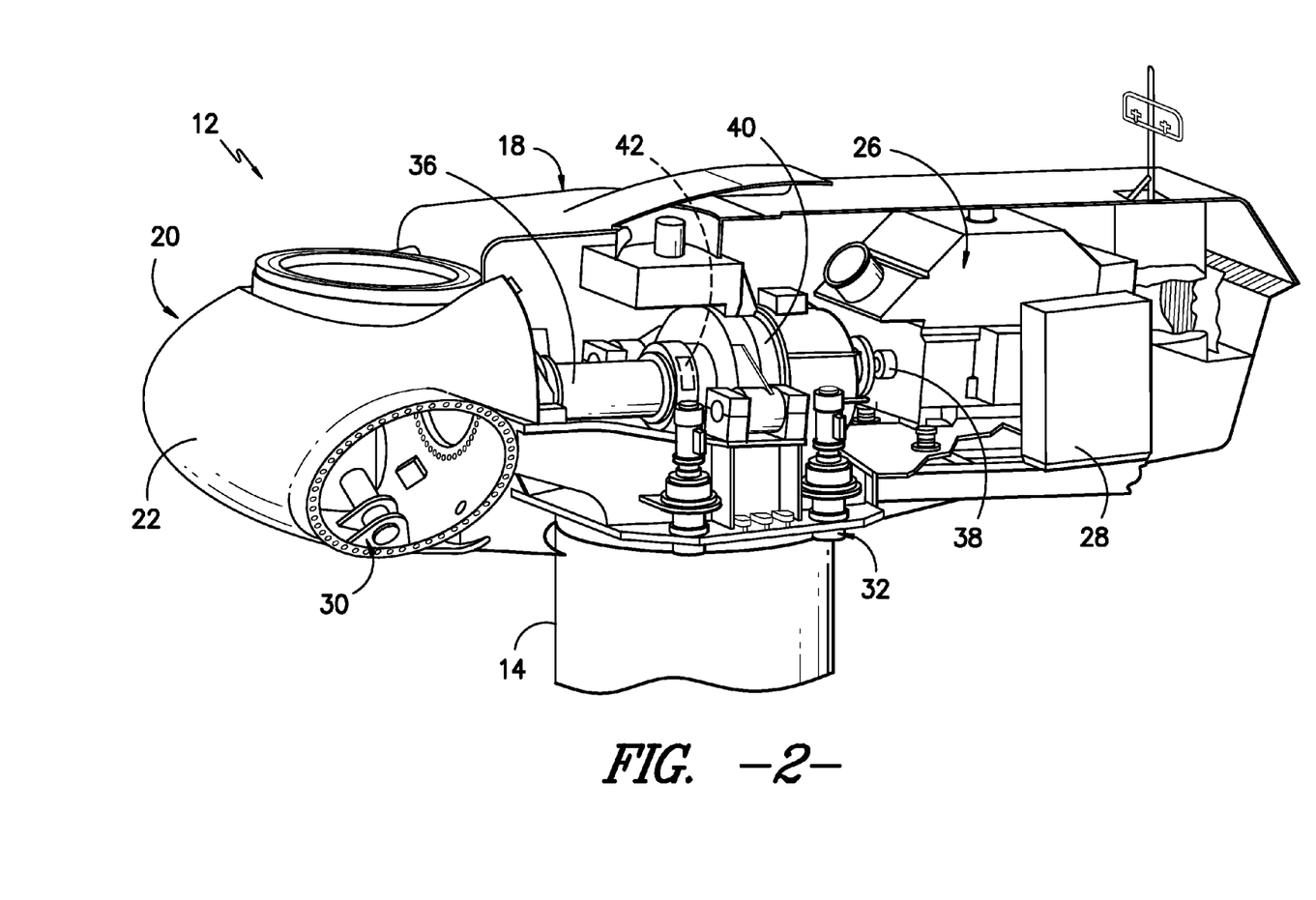
FIG. 2 illustrates a simplified, internal view of one embodiment of a nacelle of one of the wind turbines shown in FIG. 1.

Referring now to FIG. 2, a simplified, internal view of one embodiment of a nacelle 18 of one of the wind turbines 12 shown in FIG. 1 is illustrated. As shown, a generator 26 may be disposed within the nacelle 18. In general, the generator 26 may be coupled to the rotor 20 of the wind turbine 12 for producing electrical power from the rotational energy generated by the rotor 20. For example, as shown in the illustrated embodiment, the rotor 20 may include a rotor shaft 36 coupled to the hub 22 for rotation therewith. The rotor shaft 36 may, in turn, be rotatably coupled to a generator shaft 38 of the generator 26 through a gearbox 40. As is generally understood, the rotor shaft 36 may provide a low speed, high torque input to the gearbox 40 in response to rotation of the rotor blades 24 (FIG. 1) and the hub 22. The gearbox 40 may then be configured to convert the low speed, high torque input to a high speed, low torque output to drive the generator shaft 38 and, thus, the generator 26. However, in other embodiments, it should be appreciated that the generator shaft 38 may be rotatably coupled directly to the rotor shaft 36. Alternatively, the generator 26 may be directly rotatably coupled to rotor shaft 36 (often referred to as a "direct-drive wind turbine").

Additionally, as indicated above, the turbine controller 28 may also be located within the nacelle 18. As is generally understood, the turbine controller 28 may be communicatively coupled to any number of the components of the wind turbine 12 in order to control the operation of such components. For example, the turbine controller 28 may be communicatively coupled to the yaw drive mechanism 32 of the wind turbine 12 for controlling and/or altering the yaw direction of the nacelle 18 relative to the direction of the wind. Similarly, the turbine controller 28 may be communicatively coupled to each pitch adjustment mechanism 30 of the wind turbine 12 (one of which is shown) for controlling and/or altering the pitch angle of the rotor blades 24 relative to the direction of the wind. For instance, the turbine controller 28 may be configured to transmit a control signal to the pitch adjustment mechanism 30 such that one or more actuators (not shown) of the pitch adjustment mechanism 30 may be utilized to rotate the blades 24 relative to the hub 22.

Moreover, in several embodiments, the wind turbine 12 may also include one or more sensors 42 or other suitable devices for detecting and/or measuring the azimuth or rotor position of the wind turbine 12. As is generally understood, the rotor position of a wind turbine 12 may be detected and/or measured by determining the angle of rotation of the rotor 20 relative to a predetermined rotor position (e.g., the vertically upwards or twelve o'clock position).

It should be readily appreciated that the sensor(s) 42 may generally comprise any suitable sensor(s) and/or measurement device(s) known in the art for detecting and/or measuring the rotor position of a wind turbine 12. For instance, in one embodiment, the sensor(s) 42 may comprise one or more rotary or shaft encoders coupled to the rotor shaft 36 and/or the generator shaft 38 so that the angular position of such shaft(s) 36, 38 may be detected/measured and transmitted to the turbine controller 28 for subsequent processing/analysis in order to determine the rotor position of the wind turbine 12. In another embodiment, the sensor(s) 42 may comprise one or more proximity and/or position sensors configured to transmit a signal to the turbine controller 28 each time the rotor shaft 36, the generator shaft 38 and/or one of the blades 24 passes a particular angular position (e.g., the twelve o'clock position). The turbine controller 28 may then determined the rotor position of the wind turbine 12 at any given time based on the speed of the rotor 20 and/or the generator 26.

In further embodiments, it should be appreciated that the wind turbine 12 may also include various other sensors for detecting and/or measuring one or more other operating parameters and/or operating conditions of the wind turbine 12. For example, the wind turbine 12 may include sensors for detecting and/or measuring the pitch angle of each rotor blade 24, the speed of the rotor 20 and/or the rotor shaft 34, the speed of the generator 26 and/or the generator shaft 38, the torque on the rotor shaft 34, the torque on the generator shaft 36 and/or any other operational parameters/conditions of the wind turbine 12.

Figure 3:
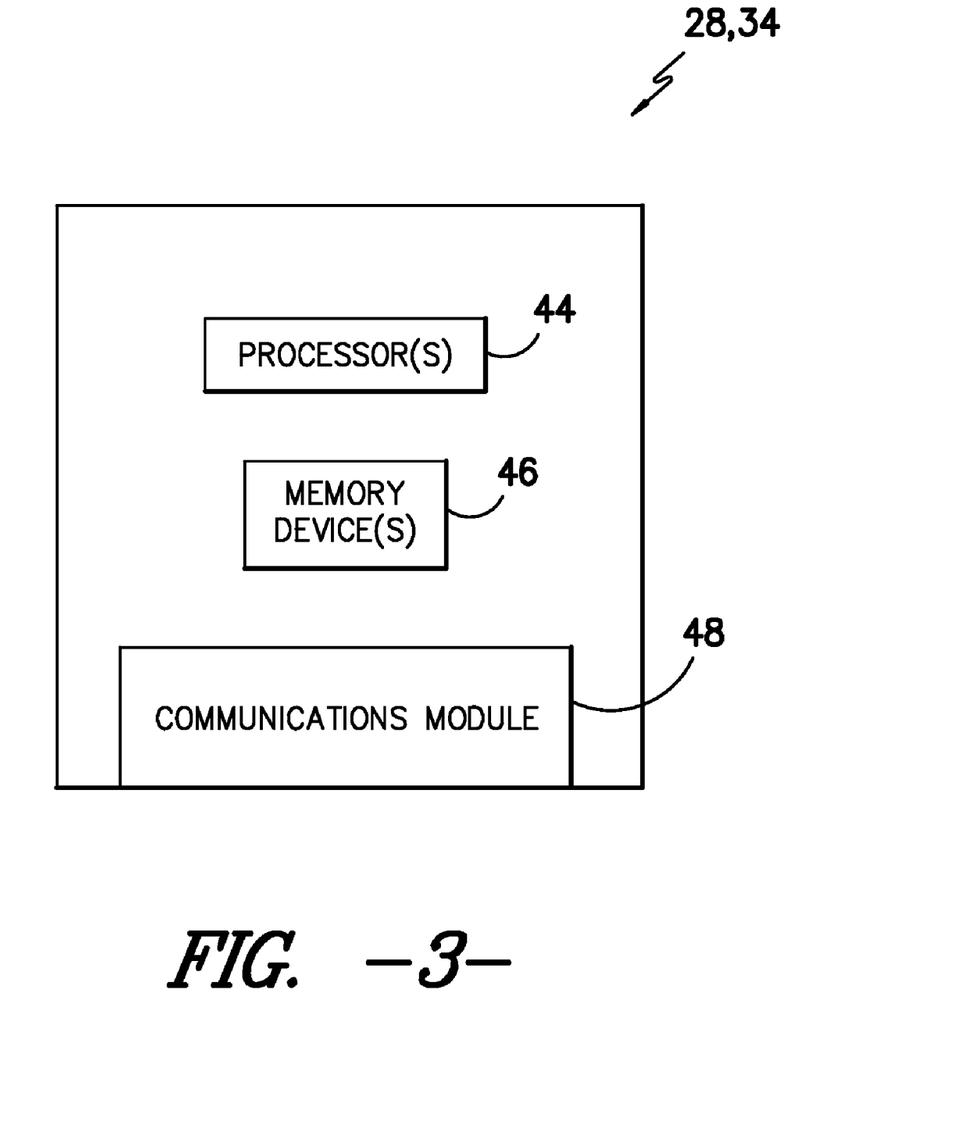
FIG. 3 illustrates a schematic view of one embodiment of components that may be included within the turbine controllers and/or the farm controller shown in FIG. 1.

Referring now to FIG. 3, there is illustrated a block diagram of one embodiment of suitable components that may be included within the turbine controller 28 and/or the farm controller 34 in accordance with aspects of the present subject matter. As shown, the turbine controller 28 and/or the farm controller 34 may include one or more processor(s) 44 and associated memory device(s) 46 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 46 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 46 may generally be configured to store suitable computer-readable instructions that, when implemented by the processor(s) 44, configure the turbine controller 28 and/or the farm controller 34 to perform various functions including, but not limited to, determining the rotor positions of one or more wind turbines 12, comparing the rotor positions of differing wind turbines 12 to one another, adjusting the operating conditions of one or more of the wind turbines 12 and/or determining the sound characteristics of the noise generated by one or more wind turbines 12.

Additionally, the turbine controller 28 and/or farm controller 34 may also include a communications module 48 to facilitate communications between the controller(s) 28, 34 and the various components of the wind turbine 10 and/or to facilitate communications between each controller 28, 34. For instance, the communications module 48 may include a sensor interface (e.g., one or more analog-to-digital converters) to permit the signals transmitted by the sensor(s) 42 to be converted into signals that can be understood and processed by the processors 44.

Figure 4:
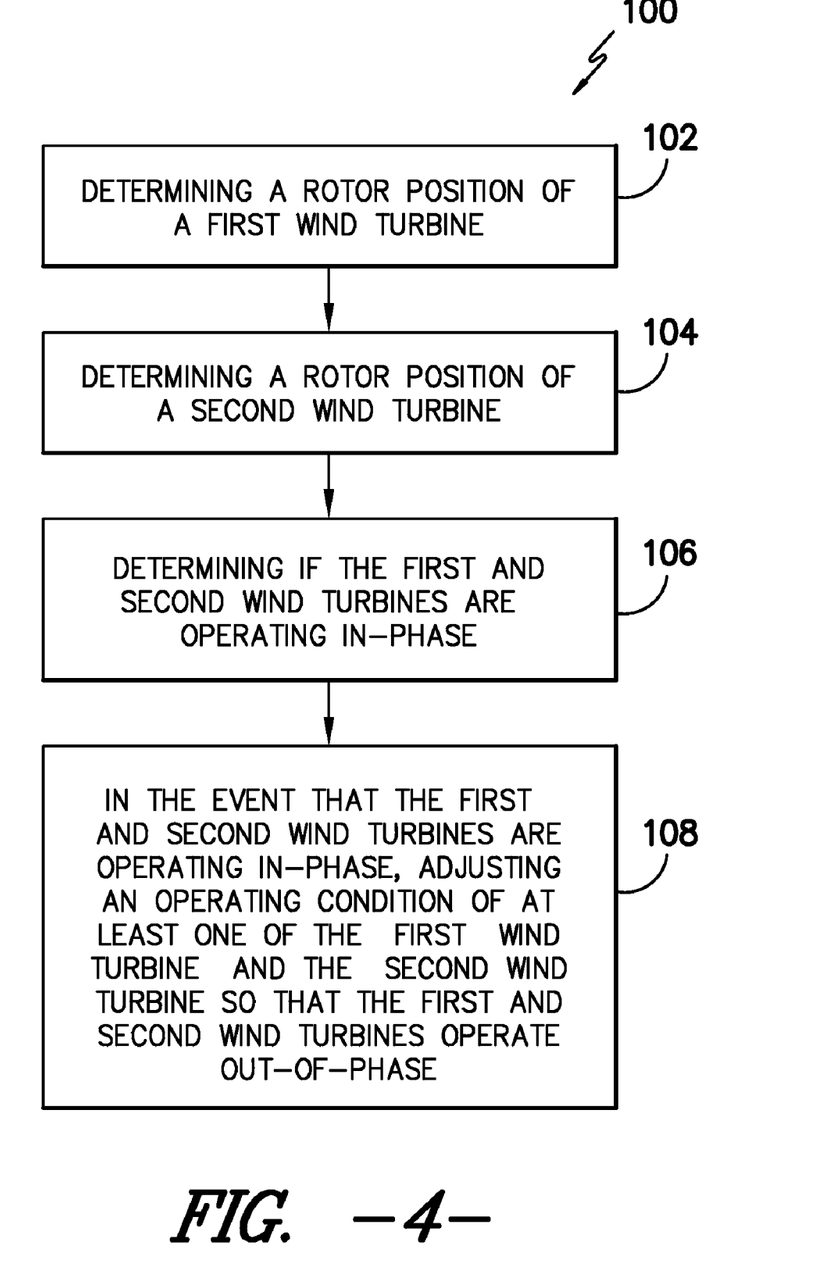
FIG. 4 illustrates a flow diagram of one embodiment of a method for controlling the amplitude modulation of noise generated by wind turbines.

Referring now to FIG. 4, there is illustrated one embodiment of a method 100 for controlling the amplitude modulation of noise generated by wind turbines 12. As shown, the method 100 generally includes determining a rotor position of a first wind turbine 102, determining a rotor position of a second wind turbine 104, determining if the first and second wind turbines are operating in-phase 106 and, in the event that the first and second wind turbines are operating in-phase, adjusting an operating condition of at least one of the first wind turbine and the second wind turbine so that the first and second wind turbines operate out-of-phase 108.

In general, the method 100 shown in FIG. 4 may be utilized to reduce the amplitude modulation of the noise generated by wind turbines 12 by preventing such wind turbines 12 from operating in-phase relative to one another. Specifically, by monitoring the rotor positions of two or more wind turbines 12 and adjusting the operating conditions of one or more of such wind turbines 12 when the wind turbines 12 are operating in-phase, the sound waves generated by the wind turbines 12 may be prevented from constructively interfering and producing a resultant sound wave having a peak-to-peak amplitude greater than the peak-to-peak amplitude of any of the individual sound waves. As such, the amplitude modulation of the sound waves propagating away from the wind turbines 12 and into the far field may be reduced, thereby reducing the magnitude of the "swooshing" or periodic pulsing sound that may be heard in the far field.

As shown in the illustrated embodiment, in 102 and 104, the rotor positions of both a first wind turbine 12 and a second wind turbine 12 may be determined. As indicated above, the rotor position of each wind turbine 12 may be actively monitored in real time using the sensor(s) 42, turbine controller 28 and/or farm controller 34 described with reference to FIGS. 1-3. For instance, the sensor(s) 42 disposed within the first and second wind turbines 12 may be configured to transmit rotor position measurement signals to each turbine controller 28 and/or the farm controller 34. The signals may then be subsequently processed/analyzed by the turbine controllers 28 and/or the farm controller 34 to determine the rotor position of each wind turbine 12.

Additionally, in 106, the rotor positions of the first and second wind turbines 12 may be compared to one another to determine if the wind turbines 12 are operating in-phase. In general, a wind turbine 12 may be considered to be operating in-phase with another wind turbine 12 when the wind turbines 12 are rotating at the same or substantially the same rotor speed and the absolute value of the difference between their rotor positions falls within a predetermined angular tolerance or range. For instance, in several embodiments, two wind turbines 12 may be considered to be operating in-phase when the absolute value of the difference between their rotor positions is equal to less than 20 degrees, such as less than 10 degrees or less than 5 degrees or less than 2 degrees or less than 1 degree. However, it should be readily appreciated by those of ordinary skill in the art that the predetermined angular tolerance or range for determining whether wind turbines 12 are operating in-phase may generally vary depending on numerous factors including, but not limited to, the particular configuration of the wind turbines 12, operating conditions of the wind turbines 12 and/or the sound characteristics (e.g., sound pressure level, modulation frequency and peak-to-peak amplitude) of the sound waves generated by the wind turbines 12.

Referring still to FIG. 4, if it is determined that the first and second wind turbines 12 are operating in-phase, in 108, an operating condition of the first wind turbine 12 and/or the second wind turbine 12 may be adjusted to bring the wind turbines 12 out-of-phase. For instance, in several embodiments, the rotor speed of the first wind turbine 12 and/or the second wind turbine 12 may be temporarily adjusted, such as by temporarily increasing or decreasing the rotor speed) so that the rotor position of the first wind turbine 12 is offset relative to the second wind turbine 12. However, in other embodiments, any other suitable operating condition(s) of the wind turbines 12 may be adjusted that permits the rotor positions of the wind turbines 12 to be offset relative to one another.

It should be readily appreciated by those of ordinary skill in the art that the rotor speed of a wind turbine 12 may be adjusted using any suitable means and/or method known in the art. Thus, in several embodiments, the rotor speed may be adjusted by adjusting the pitch angle of one or more of the rotor blades 24 of the wind turbine 12. As described above, the pitch angle of the rotor blades 24 may be controlled by transmitting a suitable control signal to the pitch adjustment mechanism 30 of the wind turbine 12. In other embodiments, the rotor speed may be adjusted by modifying the resistance or torque on the generator 26, such as by transmitting a suitable control signal to the generator 26 in order to modulate the magnetic flux produced within the generator 26. Alternatively, a braking mechanism (not shown) or other suitable device may be installed within the wind turbine 12 for adjusting the rotor speed of the rotor 20.

It should also be appreciated that, although the method elements 102, 104, 106, 108 shown in FIG. 4 generally relate to controlling the amplitude modulation of the noise generated by two wind turbines 12, the disclosed method 100 may generally be utilized to control the amplitude modulation of the noise generated by any suitable number of wind turbines 12. Thus, in several embodiments, the disclosed method 100 may be utilized to control the amplitude modulation of the noise generated by a predetermined group of wind turbines 12 forming part of a wind turbine farm 10 (FIG. 1). For example, by analyzing the sound waves generated by each wind turbine 12 within a wind turbine farm 10, it may be determined that a particular group of wind turbines 12 is generating sound waves that have an increased amplitude modulation at a particular receptor location within the far field. As such, the disclosed method 100 may be utilized to monitor the rotor positions of that particular group of wind turbines 12 in order to control the wind turbines 12 in a manner that prevents them from operating in-phase relative to one another.

Figure 5:
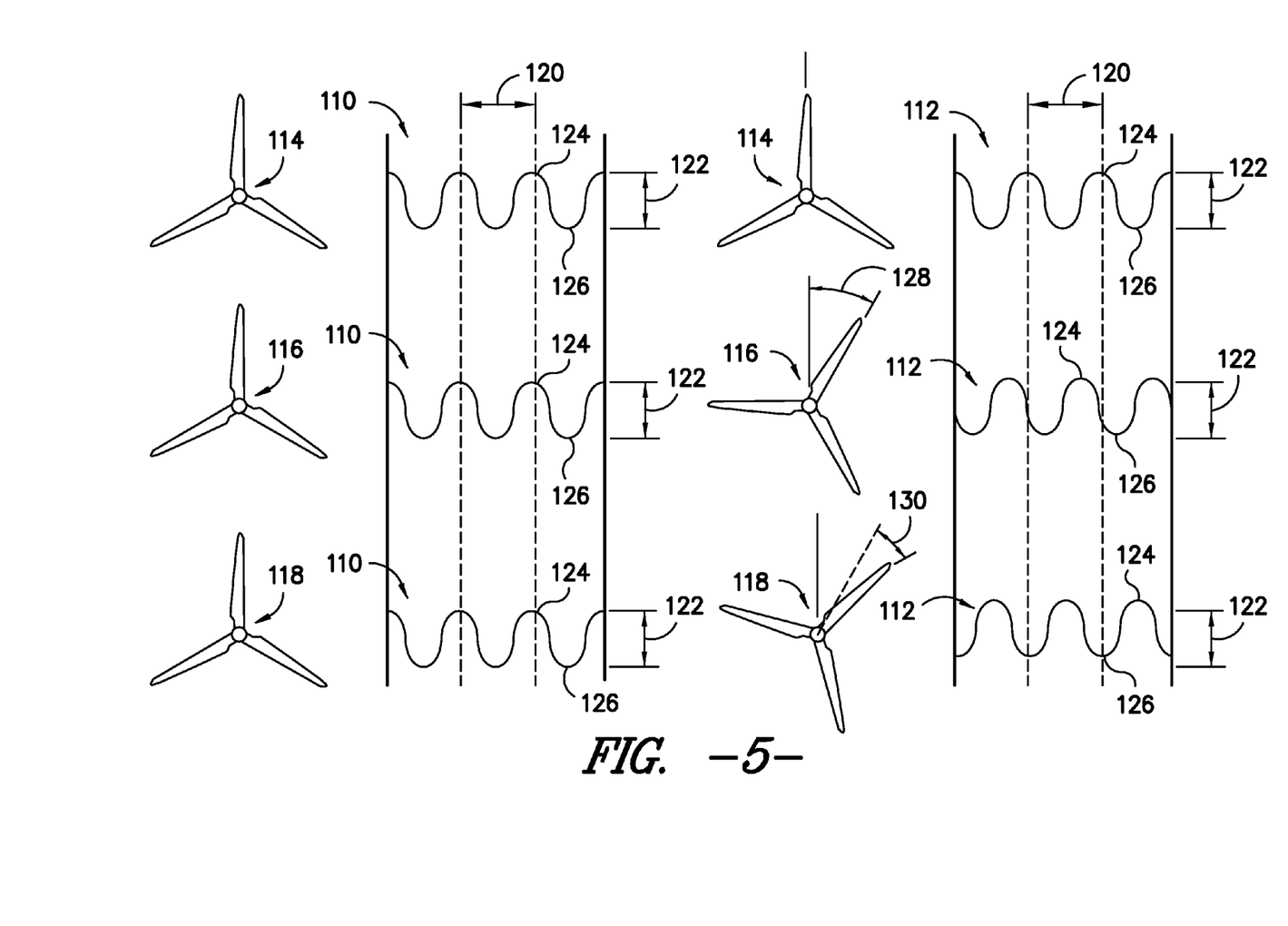
FIG. 5 illustrates a graphical view of one embodiment of sound waves generated by wind turbines operating in-phase and sound waves generated by wind turbines operating out-of-phase.

Referring now to FIG. 5, there is illustrated a comparison of the sound waves 110, 112 generated by a group of three different wind turbines (i.e., a first wind turbine 114, a second wind turbine 116 and a third wind turbine 118) before and after application of the disclosed method 100. In particular, the sound waves 110 generated while the wind turbines 114, 116, 118 are operating in-phase is illustrated on the left side of FIG. 5 and the sound waves 112 generated after the rotor positions of such wind turbines 114, 116, 118 have been offset relative to one another is illustrated on the right side of FIG. 5.

As shown, the sound waves 110, 112 generated by the wind turbines 114, 116, 118 each have the same modulation frequency 120 and peak-to-peak amplitude 122. Thus, when the rotors 20 (FIGS. 1 and 2) of the wind turbines 114, 116, 118 are aligned in a time synchronous manner so that the wind turbines 114, 116, 118 are operating in-phase, the corresponding sound waves 110 generated by the wind turbines 114, 116, 118 are also in-phase. As such, the peaks 124 and troughs 126 of each sound wave 110 are generally aligned with one another. Accordingly, in the event that the sound waves 110 traverse the same space and combine (e.g., at a particular receptor location within the far field), the resultant sound wave generated due to constructive interference may have a peak-to-peak amplitude equal to the sum of the individual peak-to-peak amplitudes 122 of the sound waves 110.

To prevent such constructive interference, an operating condition of at least two of the wind turbines 114, 116, 118 may be adjusted so that the rotor position of each wind turbine 114, 116, 118 is offset from the rotor positions of the other wind turbines 114, 116, 118. For instance, as shown on the right side of FIG. 5, an operating condition of the second wind turbine 116 may be adjusted (e.g., by temporarily adjusting the rotor speed of the second wind turbine 116 relative to the rotor speed of the first wind turbine 114) such that the rotor position of the second wind turbine 116 is offset from the rotor position of the first wind turbine 114 by a first offset angle 128. Similarly, an operating condition of the third wind turbine 118 may be adjusted (e.g., by temporarily adjusting the rotor speed of the third wind turbine 118 relative to the rotor speeds of the first and second wind turbines 114, 116) such that the rotor position of the third wind turbine 118 is offset from both the rotor position of the first wind turbine 114 and the rotor position of the second wind turbine 116. Specifically, as shown, the rotor position of the third wind turbine 118 may be offset from the rotor position of the second wind turbine 116 by a second offset angle 130 and, thus, may be offset from the rotor position of the first wind turbine 114 by the sum of the first and second offset angles 128, 130. By offsetting the rotor positions, a phase difference may be created between the sound waves 112 generated by each wind turbine 114, 116, 118. For instance, as shown in the illustrated embodiment, a 90 degree phase difference may exist between each of the sound waves 112. Accordingly, in the event that the sound waves 112 traverse the same space and combine (e.g., at a particular receptor location within the far field), the resultant sound wave generated due to interference between the sound waves 112 may have a peak-to-peak amplitude that is significantly less than the peak-to-peak amplitude of the sound wave that would otherwise be created when the wind turbines 114, 116, 118 are operating in-phase.

Figure 6:
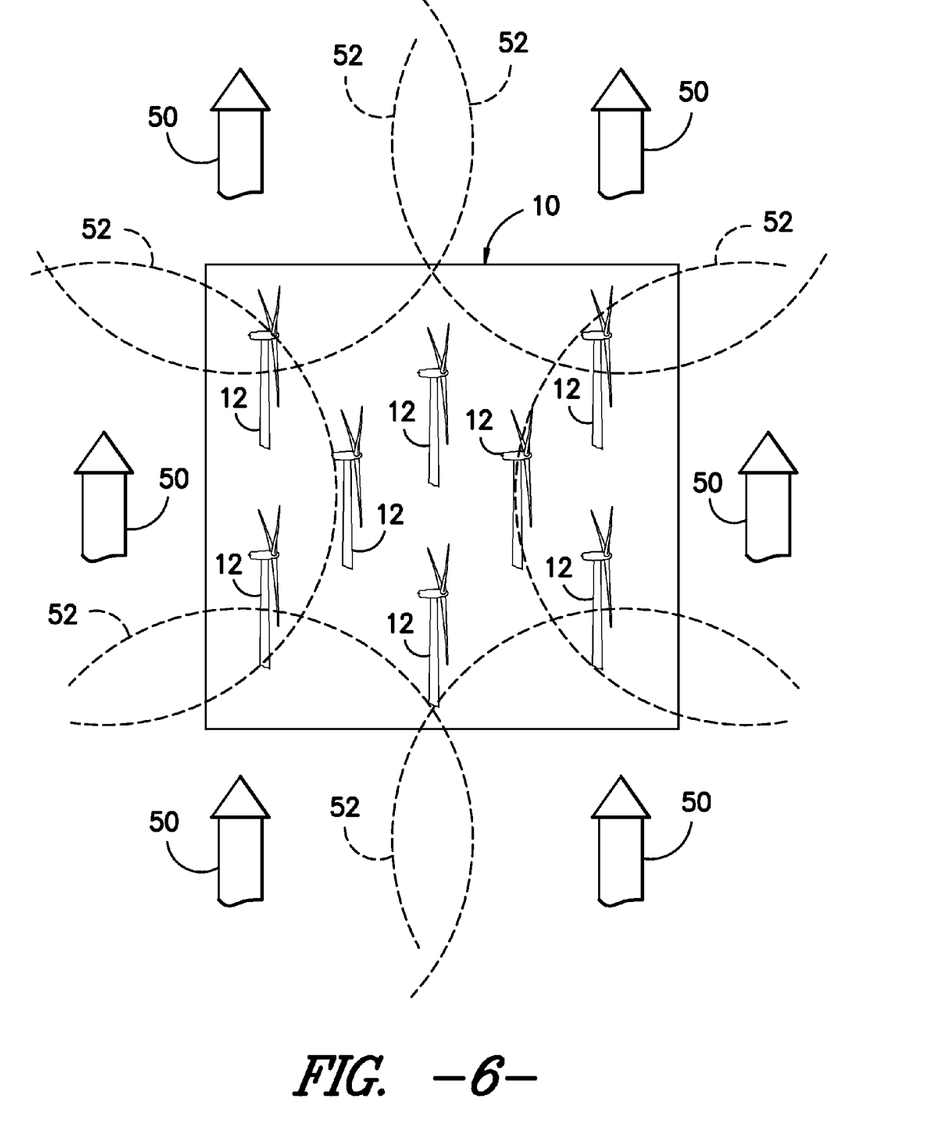
FIG. 6 illustrates a simplified view of a wind turbine farm surrounded by a plurality of receptor locations.

Additionally, in several embodiments of the present subject matter, the disclosed method 100 may take into account the affect of the amplitude modulation of the noise generated by wind turbines 12 at a plurality of different receptor locations within the far field. For example, FIG. 6 illustrates a simplified view of wind turbines 12 within a wind turbine farm 10 surrounded by a plurality of receptor locations 50. Each receptor location 50 may generally correspond to a location within the far field at which the amplitude modulation of the noise generated by the wind turbines 12 is regulated and/or is desired to be maintained below a certain threshold. For example, each receptor location 50 may correspond to one or more dwellings or other populated areas.

In general, the receptor locations 50 may be located at varying distances from the wind turbine farm 10, resulting in varying distances between each receptor location 50 and the various wind turbines 12 contained within the wind turbine farm 10. As such, due to the varying propagation distances defined between each wind turbine 12 and each receptor location 50 (as well as the varying landscapes and atmospheric effects that may be present between the wind turbines 12 and each receptor location 50), the sound waves generated by the wind turbines 12 may constructively interfere with another at one receptor location 50 and not another. Accordingly, the method 100 disclosed herein may be designed to control the wind turbines 12 based on their affect on specific receptor locations 50 within the far field.

For example, in one embodiment, after it is determined whether any of the wind turbines 12 within the wind farm 10 are operating in-phase (e.g., by comparing the rotor positions of the wind turbines 12 to one another), an optimization algorithm may be applied to determine how to bring the wind turbines 12 out-of-phase in a way that minimizes the constructive interference of the sound waves generated by the wind turbines 12 at any and/or all of the receptor locations 50. Specifically, the optimization algorithm may include the steps of identifying which of the wind turbines 12 within the wind farm 10 affect the noise heard at each receptor location 50 and then controlling such wind turbines 12 to ensure that they operate out-of-phase for the affected receptor locations 50.

In one embodiment, the group of wind turbines 12 affecting the noise heard at a specific receptor location 50 may be identified experimentally or mathematically, such as by measuring the noise heard at each receptor location 50 when particular wind turbines 10 are in operation or by calculating which turbines may affect each receptor location using the propagation distances defined between each wind turbine 12 and the particular receptor location being analyzed. Alternatively, as shown in FIG. 6, a predetermined radius 52 may be defined around each receptor location 50 within which it is believed there is a substantial likelihood that the sound waves generated by the wind turbines 12 falling within such radius 52 may constructively interfere with another at the corresponding receptor location 50. As such, it may be assumed that the group of wind turbines 12 contained within the radius 52 defined for a particular receptor location 50 affect the noise heard at such receptor location 50.

Upon determining the group of wind turbines 12 that affect the noise heard at each receptor location 50, such wind turbines 12 may then be brought out-of-phase relative to another to reduce the likelihood of the sound waves generated by the wind turbines 12 from constructively interfering at the affected receptor location(s) 50. For example, as described above, an operating condition of one or more of the wind turbines 12 (e.g., rotor speed) may be adjusted to bring the wind turbines 12 out-of-phase.

It should be appreciated that one or more of the wind turbines 12 within the wind turbine farm 10 may affect the noise heard at various different receptor locations. For instance, as shown in FIG. 6, the radii defined for the receptor locations may overlap one another. Accordingly, the wind turbine(s) 12 affecting two or more receptor locations may be controlled to ensure that they do not operate in-phase with any of the other wind turbines 12 affecting any of such receptor locations.

Figure 7:
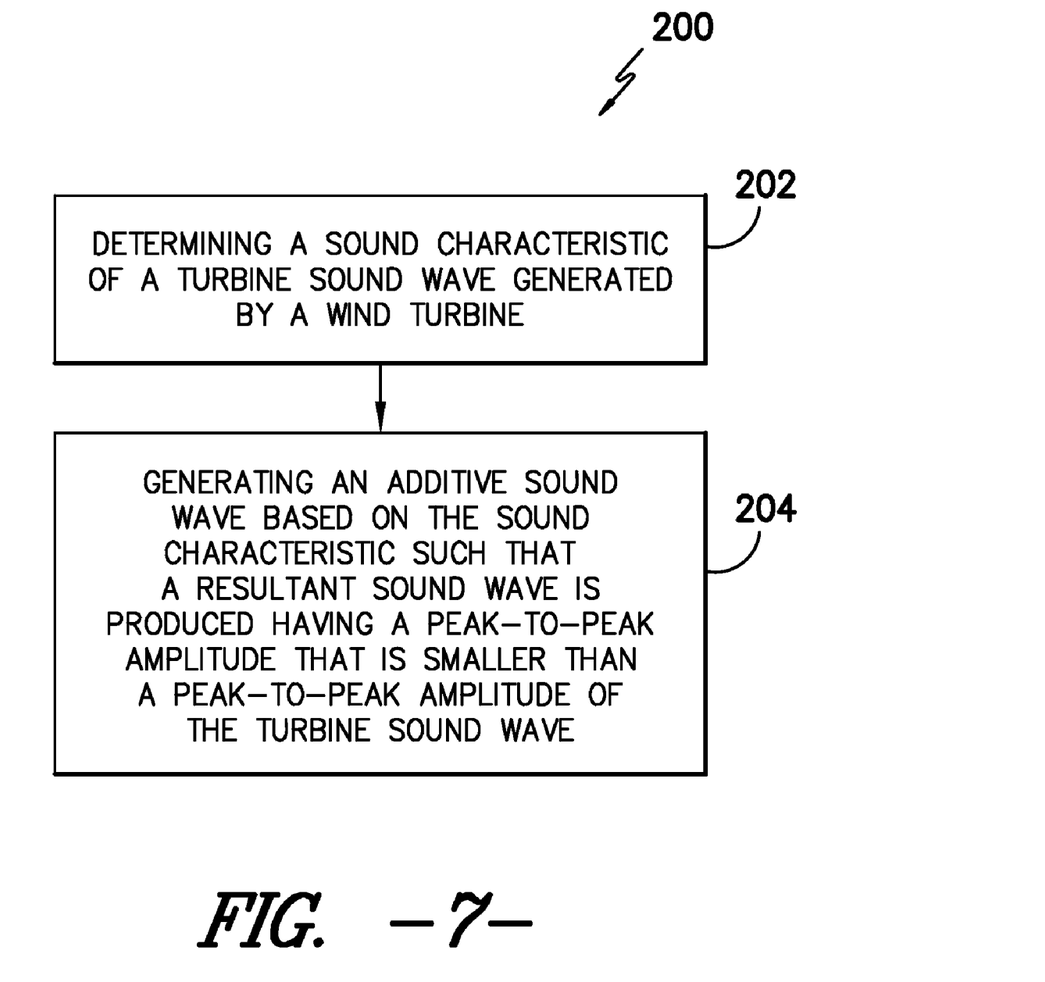
FIG. 7 illustrates a flow diagram of another embodiment of a method for controlling the amplitude modulation of noise generated by wind turbines.

Referring now to FIG. 7, there is illustrated another embodiment a method 200 for controlling the amplitude modulation of noise generated by wind turbines 12. As shown, the method 200 generally includes determining a sound characteristic of a turbine sound wave generated by a wind turbine 202 and generating an additive sound wave based on the sound characteristic such that a resultant sound wave is produced having a peak-to-peak amplitude that is smaller than a peak-to-peak amplitude of the turbine sound wave 204.

In general, the method 200 shown in FIG. 7 may be utilized to reduce the amplitude modulation of the noise generated by wind turbines 12 by combining the wind turbine noise with an additive noise. In particular, by determining one or more sound characteristics of the sound waves generated by a wind turbine 12 and generating additive sound waves based on the sound characteristic(s), a resultant sound wave may be produced due to interference between the sound waves that has a peak-to-peak amplitude smaller than the peak-to-peak amplitude of the turbine sound waves. As such, the amplitude modulation of the sound waves propagating into the far field may be reduced.

Figure 8:
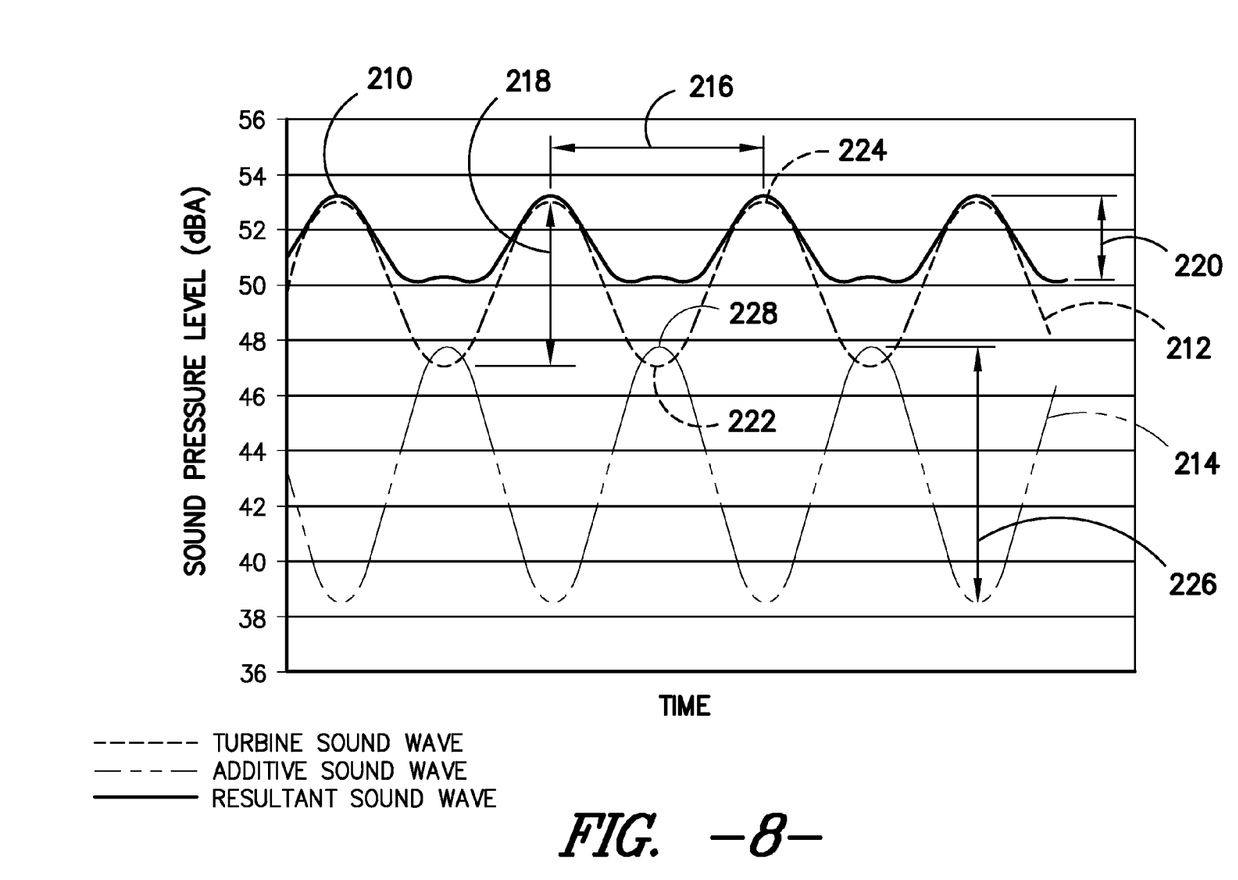
FIG. 8 illustrates a graphical view of one embodiment of a resultant sound wave that may be produced by interfering and/or augmenting a turbine sound wave with an additive sound wave; and, FIG. 9 illustrates a perspective view of one of the wind turbines shown in FIG. 1, particularly illustrating a sound meter and speakers located relative to the wind turbine.

For example, FIG. 8 illustrates a graphical view of one embodiment of a resultant sound wave (indicated by line 210) that may be produced by interfering and/or augmenting the sound wave generated by a wind turbine 12 (indicated by line 212) with an additive sound wave (indicated by line 214). As shown, the turbine sound waves 212 may have particular sound characteristics, such as an average sound pressure level (e.g., approximately 50.5 dBA in the illustrated embodiment), modulation frequency 216 and peak-to-peak amplitude 218. Thus, by determining the sound characteristics of the turbine sound waves 212, it may be possible to introduce additive sound waves 214 that interfere with and/or augment the turbine sound waves 212 in order to reduce the overall peak-to-peak amplitude 220 of the resulting noise. For instance, as shown in the illustrated embodiment, additive sound waves 214 may be generated that interfere with and/or augment the trough 222 of the turbine sound wave 212 without significantly affecting the peak 224 of the turbine sound wave 212. In other words, additive sound waves 214 may be generated such that a phase difference exists between the additive sound waves 214 and the turbine sound waves 212. For example, in several embodiments, the phase difference between the additive sound waves 214 and the turbine sound waves 212 may be equal to about 180 degrees. As such, by appropriately selecting the sound pressure level and/or the peak-to-peak amplitude 226 of the additive sound waves 214 to be generated (e.g., by generating additive sound waves 214 having an average sound pressure level less than the average sound pressure level of the turbines sound waves 212), the peaks 228 of the additive sound waves 214 may be aligned with and overlap the troughs 222 of the turbine sound waves 212, thereby creating resultant sound waves 210 having a peak-to-peak amplitude 220 significantly less than the peak-to-peak amplitude 218 of the turbine sound waves 212. Accordingly, even through an overall increase in noise may result from the addition of the additive noise, the amplitude modulation responsible for creating the objectionable "swooshing" or periodic pulsing sound may be significantly reduced.

Figure 9:
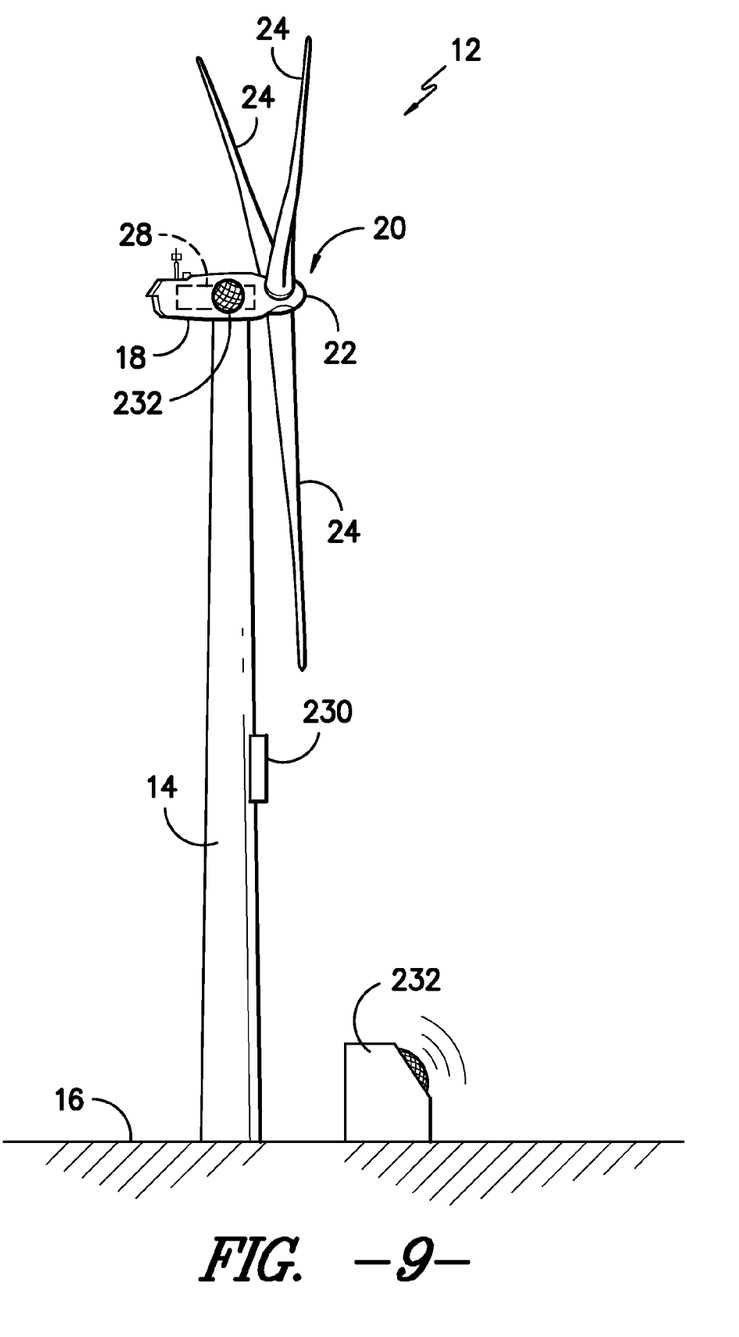

It should be appreciated that the sound characteristics of the turbine sound waves 212 may be determined using any suitable means and/or method known in the art. For instance, in several embodiments, one or more sound meters 230, such as one or more noise dosimeters, microphones, sound level meters and/or any other suitable sound measurement devices, may be positioned at a location(s) relative to the wind turbine 12 such that the sound pressure level, modulation frequency 216 and/or peak-to-peak amplitude 218 of the turbine sound waves 212 may be accurately measured and/or determined. Specifically, as shown in FIG. 9, in one embodiment, the sound meter(s) 230 may be embedded within and/or mounted to a component of the wind turbine tower 10 (e.g., the wind turbine tower 14). However, in alternative embodiments, the sound meter(s) 230 may be disposed at any other suitable location relative to the wind turbine 12 (e.g., a location separate from the wind turbine 12) that allows for the accurate measurement and/or determination of the sound characteristics of the turbine sound waves 212.

Additionally, the sound meter(s) 230 may be communicatively coupled to the turbine controller 28 and/or the farm controller 34 (e.g., via a wired or wireless connection) such that the sound measurement signals generated by the sound meter(s) 230 may be transmitted to the turbine controller 28 and/or farm controller 34 for subsequent processing/analysis. For instance, the turbine controller 28 and/or the farm controller 34 may be provided with suitable computer-readable instructions that, when implemented, configure the controller(s) 28, 34 to process and/or interpret the measurement signals in order to determine the sound characteristics of the turbine sound waves 212.

It should also be appreciated that the additive sound waves 214 described above may be generated using any suitable sound generating device known in the art. For example, in several embodiments, one or more speakers 232 may be mounted to and/or embedded within a component of the wind turbine 12 to permit the additive sound waves 214 to be generated. Thus, as shown in FIG. 9, in one embodiment, the speaker(s) 232 may be mounted to and/or embedded within the nacelle 18 of the wind turbine 12. Alternatively, the speaker(s) 232 may be located at any other suitable location separate from the wind turbine 12, such as on the support surface 16. In addition, the speaker(s) 232 may be communicatively coupled the turbine controller 28 and/or the farm controller 34 (e.g., via a wired or wireless connection). As such, upon determination of the sound characteristics of the turbine sound waves 212, the turbine controller 28 and/or the farm controller 34 may transmit suitable signals to the speaker(s) 232 for generating the additive sound waves 214 necessary to produce resultant sound waves 210 having reduced peak-to-peak amplitudes.

In alternative embodiments, the sound generating device may comprise another aerodynamic noise source. For example, in one embodiment, the sound generating device may comprise a fan or a jet. In another embodiment, the nacelle 18 or an electronic cooling system (not shown) of the wind turbine 12 may be modified so that such components generate the necessary additive sound waves 214.

Additionally, it should be appreciated that the method 200 shown in FIG. 7 may be utilized to control the amplitude modulation of the noise generated by any number of wind turbines 12. For example, in several embodiments, each wind turbine 12 within a wind turbine farm 10 (FIG. 1) may include one or more sound meters 230 and speakers 232 for measuring the sound waves 212 generated by the wind turbine 12 and for generating additive sound waves 214 based on the turbine sound waves 214. Alternatively, one or more sound meters 230 may be utilized to measure the sound characteristics of the sound waves 214 generated by each wind turbine within a group of wind turbines 12 and one or more speakers 232 may be utilized to generate additive sound waves 212 based on the sound characteristics of the sound waves 214. For instance, when two or more wind turbines 12 are operating in-phase, a single speaker 232 or set of speakers 232 may be utilized to produce additive sound waves 214 capable of reducing the amplitude modulation of the noise generated by each of the wind turbines 12. As such, a resultant sound wave 210 may be produced that has a peak-to-peak amplitude 220 that is smaller than a peak-to-peak amplitude 218 of each turbine sound wave 212 generated by the wind turbines 12.

Moreover, it should be readily appreciated that the methods disclosed herein 100, 200 need not be utilized in isolation. For example, a combination of both methods 100, 200 may be utilized to control the amplitude modulation of the noise generated by one or more wind turbines 12. Specifically, in one embodiment, when it is desired to control the amplitude modulation of the noise generated by a plurality of wind turbines 12 affecting one or more receptor locations 50 within the far field, the amplitude modulation may be controlled by generating an additive sound wave for some of the wind turbines 12 and by controlling the other wind turbines 12 to ensure that they operate out-of-phase. Further, one of ordinary skill in the art should appreciate that the disclosed methods 100, 200 provide for amplitude modulation control with little or no decrease in the power output of a wind turbine 10.

Further, it should be appreciated that the present subject matter is also directed to a system for controlling the amplitude modulation of noise generated by one or more wind turbines. For example, in several embodiments, the system of the present subject matter may include a first wind turbine 12 (FIG. 1) having a first rotor position and a second wind turbine 12 (FIG. 1) having a second rotor position. Additionally, the system may include a controller 28, 34 (FIG. 1) configured to determine if the first and second wind turbines 12 are operating in-phase by comparing the first rotor position to the second rotor position. For instance, as described above, each turbine controller 28 and/or the farm controller 34 may be communicatively coupled to one or more sensor(s) 42 (FIG. 2) configured to both measure the rotor position of a wind turbine 12 and transmit signals relating to such rotor position measurements to the controller(s) 28, 34 for subsequent processing/analysis. Thus, in one embodiment, a first sensor(s) 42 may be disposed in the first wind turbine 12 for measuring the first rotor position and a second sensor(s) 42 may be disposed in the second wind turbine for measuring the second rotor position, with the controller(s) 28, 34 being communicatively coupled to the first and second sensors 42 (e.g., via a wired or wireless connection). Based on the rotor position measurements received from the first and second sensors 42, the controller(s) 28, 34 may then determine if the first and second wind turbines are operating in-phase, such as by comparing the absolute value of the difference between the first and second rotor positions to a predetermined in-phase tolerance. Additionally, the controller(s) 28, 34 of the disclosed system may also be configured to adjust an operating condition of the first wind turbine 12 and/or the second wind turbine 12 if it is determined that the first and second wind turbines 12 are operating in-phase. For instance, as described above, the controller(s) 28, 34 may adjust the rotor speed of one or both of the wind turbines 12 to bring the wind turbines 12 out-of-phase relative to one another.

Of course, one of ordinary skill in the art should appreciate that system described above need not be limited to a first wind turbine 12 and a second wind turbine 12, but may generally include a plurality of wind turbines 12 having a plurality of rotor positions. In such an embodiment, the controller(s) 28, 34 may be configured to both determine if any of the wind turbines 12 are operating in-phase and adjust an operating parameter of one or more of the wind turbines 12 to ensure that the wind turbines 12 operate out-of-phase.

In other embodiments, the system of the present subject matter may include a sound meter 230 (FIG. 9) configured to measure a sound characteristic of a turbine sound wave 212 (FIG. 8) generated by a wind turbine 12, a sound generating device (e.g., one or more speakers 232 (FIG. 9) configured to generate an additive sound wave 214 (FIG. 8) and a controller(s) 28, 34 (FIG. 1) communicatively coupled to the sound meter 230 and the sound generating device. The controller(s) 28, 34 may generally be configured to receive sound characteristic measurements from the sound meter 230 and, based on such measurements, control the additive sound wave 214 generated by sound generating device so that a resultant sound wave 210 (FIG. 8) is produced that has a peak-to-peak amplitude 220 (FIG. 8) that is smaller than a peak-to-peak amplitude 218 (FIG. 8) of the turbine sound wave 212.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the amplitude modulation of noise generated by a wind turbine, the method comprising:
   determining a sound characteristic of a turbine sound wave generated by a wind turbine; and,
   generating an additive sound wave based on the sound characteristic such that a resultant sound wave is produced having both a peak-to-peak amplitude that is smaller than a peak-to-peak amplitude of the turbine sound wave and an average sound pressure level that is greater than an average sound pressure level of the turbine sound wave,
   wherein the additive sound wave has an average sound pressure level that is less than the average sound pressure level of the turbine sound wave.

2. The method of claim 1, wherein the sound characteristic comprises at least one of a sound pressure level, a modulation frequency and the peak-to-peak amplitude of the turbine sound wave.

3. The method of claim 2, wherein the additive sound wave has a modulation frequency that is generally equal to the modulation frequency of the turbine sound wave.

4. The method of claim 3, wherein the sound pressure level of the additive sound wave is selected such that a peak of the additive sound wave overlaps a trough of the turbine sound wave.

5. The method of claim 1, wherein a phase difference exists between the turbine sound wave and the additive sound wave.

6. The method of claim 5, wherein the phase difference is equal to about 180 degrees.

7. The method of claim 1, wherein determining a sound characteristic of a turbine sound wave generated by a wind turbine comprises receiving a signal related to the sound characteristic from a sound meter.

8. The method of claim 7, wherein receiving a signal related to the sound characteristic from a sound meter comprises receiving the signal by a controller communicatively coupled to the sound meter.

9. The method of claim 1, wherein generating an additive sound wave based on the sound characteristic such that a resultant sound wave is produced having a peak-to-peak amplitude that is smaller than a peak-to-peak amplitude of the turbine sound wave comprises generating the additive sound wave using a sound generating device.

10. The method of claim 9, further comprising transmitting a signal by a controller to the sound generating device.

11. A method for controlling the amplitude modulation of noise generated by a plurality of wind turbines, the method comprising:
    determining a sound characteristic of a turbine sound wave generated by each wind turbine of the plurality of wind turbines; and,
    generating an additive sound wave based on the sound characteristic of each turbine sound wave such that a resultant sound wave is produced having both a peak-to-peak amplitude that is smaller than a peak-to-peak amplitude of each turbine sound wave and an average sound pressure level that is greater than an average sound pressure level of the turbine sound wave,
    wherein the additive sound wave has an average sound pressure level that is less than the average sound pressure level of the turbine sound wave.

12. A system for controlling the amplitude modulation of noise generated by a wind turbine, the system comprising:
    a sound meter configured to measure a sound characteristic of a turbine sound wave generated by the wind turbine;
    a sound generating device configured to generate an additive sound wave; and,
    a controller communicatively coupled to the sound meter and the sound generating device, the controller being configured to receive sound characteristic measurements from the sound meter and, based on the sound characteristic measurements, control the additive sound wave that is generated by the sound generating device so that a resultant sound wave is produced that has both a peak-to-peak amplitude that is smaller than a peak-to-peak amplitude of the turbine sound wave and an average sound pressure level that is greater than an average sound pressure level of the turbine sound wave,
    wherein the additive sound wave has an average sound pressure level that is less than the average sound pressure level of the turbine sound wave.

13. The system of claim 12, wherein the sound characteristic comprises at least one of a sound pressure level, a modulation frequency and the peak-to-peak amplitude of the turbine sound wave.

14. The system of claim 13, wherein the additive sound wave has a modulation frequency that is generally equal to the modulation frequency of the turbine sound wave.

15. The method of claim 14, wherein the sound pressure level of the additive sound wave is selected such that a peak of the additive sound wave overlaps a trough of the turbine sound wave.

16. The system of claim 13, wherein a phase difference exists between the turbine sound wave and the additive sound wave.

17. The system of claim 12, wherein the sound generating device comprises a speaker disposed separate from the wind turbine.

18. The system of claim 12, wherein the sound generating device comprises a speaker mounted to or embedded within a component of the wind turbine.

19. The system of claim 12, wherein the sound meter comprises at least one of a noise dosimeter, a microphone and a sound level meter.

20. The system of claim 12, wherein the sound meter is mounted to or embedded within a component of the wind turbine or the sound meter is disposed separate from the wind turbine.

* * * * *